(12) United States Patent
Hao et al.

(10) Patent No.: US 9,806,337 B2
(45) Date of Patent: Oct. 31, 2017

(54) ELECTRODE STRUCTURE HAVING ALTERNATING COMPOSITE LAYERS

(71) Applicant: Nissan North America, Inc., Franklin, TN (US)

(72) Inventors: Xiaoguang Hao, Farmington Hills, MI (US); Kenzo Oshihara, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 168 days.

(21) Appl. No.: 14/597,389

(22) Filed: Jan. 15, 2015

(65) Prior Publication Data

US 2016/0211513 A1    Jul. 21, 2016

(51) Int. Cl.

| | |
|---|---|
| *H01M 4/36* | (2006.01) |
| *H01M 4/38* | (2006.01) |
| *H01M 4/587* | (2010.01) |
| *H01M 4/133* | (2010.01) |
| *H01M 10/052* | (2010.01) |

(52) U.S. Cl.
CPC ........... *H01M 4/366* (2013.01); *H01M 4/133* (2013.01); *H01M 4/386* (2013.01); *H01M 4/387* (2013.01); *H01M 4/587* (2013.01); *H01M 10/052* (2013.01); *H01M 2220/20* (2013.01); *Y02E 60/122* (2013.01)

(58) Field of Classification Search
CPC ....... H01M 4/366; H01M 4/587; H01M 4/386
See application file for complete search history.

(56) References Cited

U.S. PATENT DOCUMENTS

| 7,985,454 B2 | 7/2011 | Niu et al. | |
|---|---|---|---|
| 2002/0009646 A1* | 1/2002 | Matsubara | H01M 2/32 429/231.8 |
| 2003/0036000 A1* | 2/2003 | Mori | H01M 4/13 429/231.95 |
| 2003/0129497 A1* | 7/2003 | Yamamoto | H01M 4/131 429/246 |
| 2006/0024579 A1* | 2/2006 | Kolosnitsyn | H01M 4/13 429/209 |
| 2007/0009797 A1* | 1/2007 | Takami | H01M 2/1077 429/231.1 |

(Continued)

FOREIGN PATENT DOCUMENTS

| RU | 132917 U1 | 9/2013 |
|---|---|---|
| WO | 2014014376 A1 | 1/2014 |
| WO | 2014116029 A1 | 7/2014 |

*Primary Examiner* — Ula C Ruddock
*Assistant Examiner* — Osei Amponsah
(74) *Attorney, Agent, or Firm* — Young Basile Hanlon & MacFarlane, P.C.

(57) ABSTRACT

An electrode comprises a current collector and a multi-layer active material formed on the current collector. The multi-layer active material includes at least one active composite unit having a first layer consisting essentially of a first carbon material having electrochemical activity and a binder and a second layer formed on the first layer comprising a high energy density material. A top layer is formed on the active composite unit consisting essentially of a second carbon material having electrochemical activity and a binder. The electrode provides even current distribution and compensates for particle volume expansion.

13 Claims, 3 Drawing Sheets

(56) References Cited

U.S. PATENT DOCUMENTS

2007/0166613 A1\* 7/2007 Kogetsu ............... H01M 4/134
  429/218.1
2011/0111300 A1 5/2011 DelHagen et al.
2012/0125853 A1 5/2012 Nomura et al.

\* cited by examiner

ELECTRODE STRUCTURE HAVING ALTERNATING COMPOSITE LAYERS

TECHNICAL FIELD

This disclosure relates to an electrode structure that uses alternating active material layers to increase electrode durability by providing more uniform expansion of active material particles.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

An electrode is disclosed that comprises a current collector and an multi-layer active material formed on the current collector. The multi-layer active material comprises at least one active composite unit having a first layer of catalyst consisting essentially of a first carbon material having electrochemical activity and a binder and a second layer of catalyst formed on the first layer comprising a high energy density material. A top layer is formed on the active composite unit consisting essentially of a second carbon material having electrochemical activity and a binder.

Another embodiment of an electrode disclosed herein comprises a current collector, a first layer formed on the current collector consisting essentially of a first carbon material having electrochemical activity and a binder, a second layer formed on the first layer comprising one of a silicon material and a tin material and a top layer consisting essentially of a second carbon material having electrochemical activity and a binder.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Because the carbon material used in electrodes of conventional batteries, such as lithium ion batteries or sodium ion batteries, suffers from a low specific capacity, the conventional battery has poor energy density even though there is small polarization and good stability. To increase the energy density of batteries using carbon electrodes, alternative active materials with higher energy densities are required. Silicon, tin, germanium and their oxides and alloys are non-limiting examples of materials that may be added to an electrode active material layer to improve its energy density, among other benefits.

One particular example is the use of silicon in lithium-ion batteries. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon can cause particle cracking and pulverization when the silicon has no room to expand. This expansion also leads to electrode delamination, loss of porosity, electrical isolation of the active material, increase in electrode thickness, rapid capacity fade and ultimate cell failure.

Figure 1:
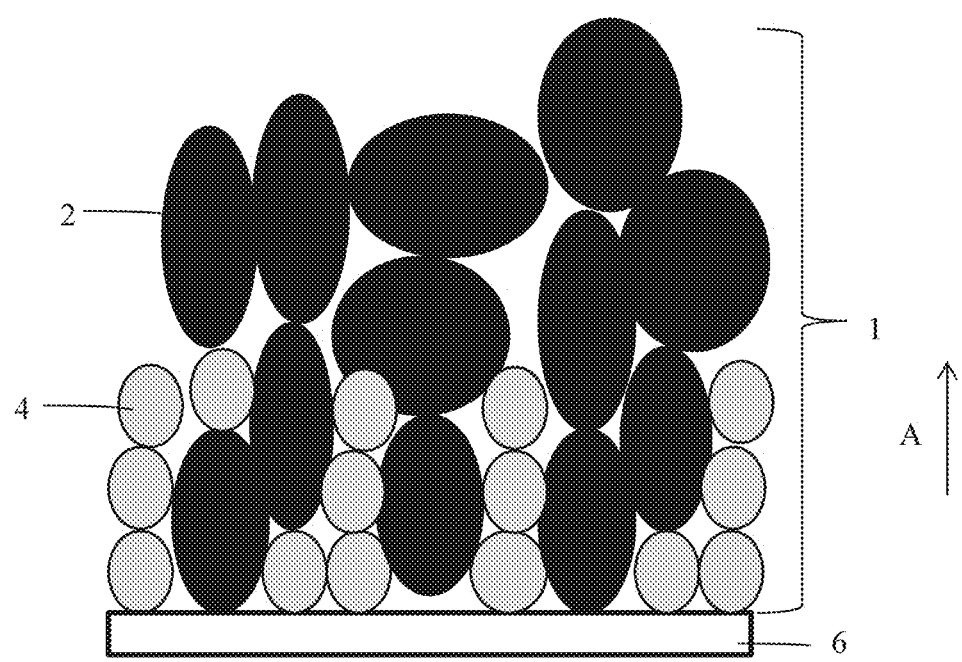
FIG. 1 is a schematic drawing representing expansion of a conventional silicon and graphite electrode.

The expansion of the silicon particles is depicted in FIG. 1. An active material layer 1 of silicon particles 2 and carbon particles 4 are formed on a current collector 6. As the silicon particles 2 and the carbon particles 4 expand due to lithiation, the 300+ times expansion of the silicon particles 2 causes the particle shape to deform and expand into available voids. This reduces the porosity across the active material layer 1. Particles on the bottom of the active material layer 1 suffer the greatest mechanical stress and pressure. This can cause delamination between the active material layer 1 and the current collector 6. As cycling of the battery continues, delamination increases. As the contact between the current collector 6 and active material layer 1 worsens, polarization of the electrode increases and electrode capacity drops. As the silicon particles 2 continue to exert pressure due to expansion on neighboring particles, particle cracking and other damage can occur. As the majority of the expansion occurs in one dimension as shown with arrow A, the volume expansion of the electrode is amplified in that dimension, further contributing to the electrode's polarization and loss of capacity.

Figure 2:
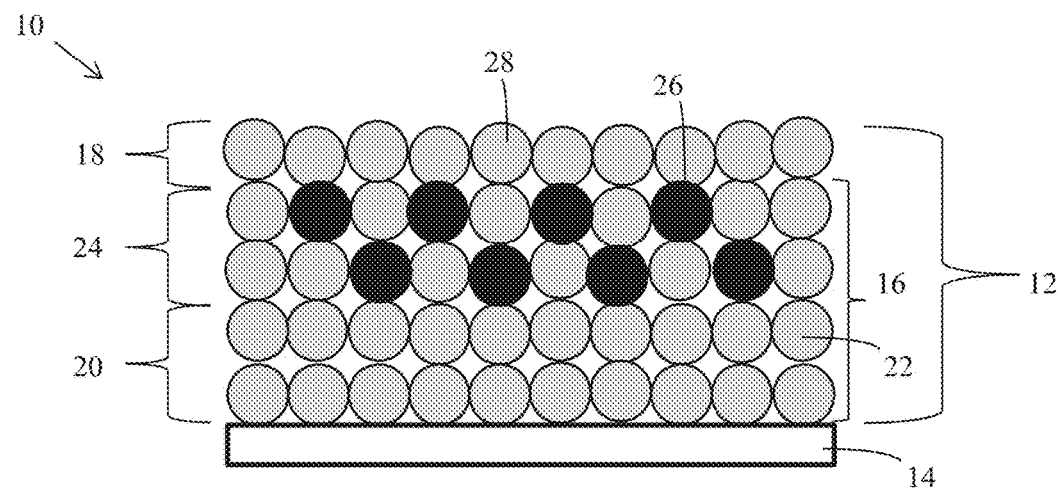
FIG. 2 is a schematic drawing of an embodiment of an electrode as disclosed herein.
Figure 4:
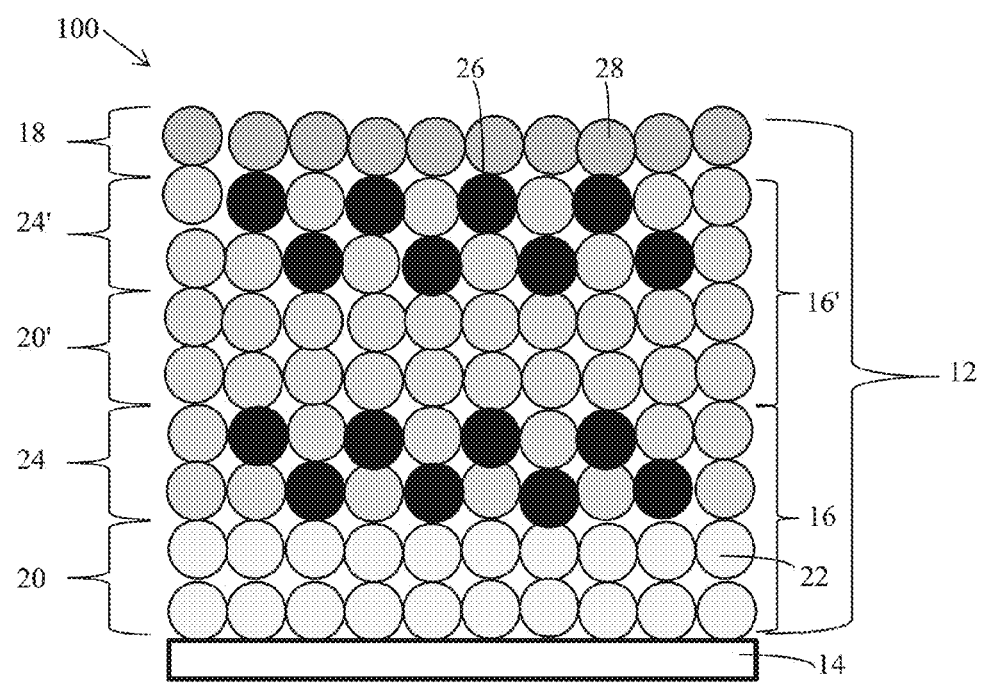
FIG. 4 is a schematic drawing of another embodiment of an electrode as disclosed herein.

Disclosed herein are electrode structures designed to improve stability by making uniform the current distribution over the whole area of the electrode and reducing the volume change of the electrode due to lithiation. FIG. 2 illustrates one embodiment of an electrode as disclosed herein. The electrode 10 comprises a multi-layer active material 12 on a current collector 14. The multi-layer active material 12 comprises at least one active composite unit 16 and a top layer 18. FIG. 2 is an example of an electrode 10 with only one active composite unit 16. FIG. 4 illustrates an electrode 100 having two active composite units 16. The figures are not meant to be limiting—the number of active composite units 16 can be more than two as desired or required by those skilled in the art.

The material of the current collector 14 can be a metal foil such as nickel, iron, copper, aluminum, stainless steel and carbon, as non-limiting examples, as well as any other material known to those skilled in the art for the electrode applications. The current collector 14 can have a thickness in the range of about 5 μm to about 15 μm.

Each active composite unit 16 comprises a first layer 20 of catalyst consisting essentially of a first carbon material 22 having electrochemical activity and a binder. The first carbon material 22 can include one or more of graphene, graphite, surface modified graphite, carbon nanotubes, carbon black, hard carbon, soft carbon and any other carbon materials known to those skilled in the art having the requisite electrochemical activity. The first layer 20 further includes a binder, such as any commercially available binders known to those skilled in the art. The ratio by volume of carbon to binder should be greater than eighty percent. The first layer 20 can further include a conductive additive, such as any commercially available conductive additives known to those skilled in the art.

The first layer 20 of the first or only active composite unit 16 is formed on the current collector 14. This first layer 20 comprises carbon material 22 that undergoes minimal expansion when lithiated, so there is little to no delamination between the multi-layer active material 12 and the current collector 14. The first layer 20 can range in thickness from about 2 μm to about 20 μm. The thickness will be selected depending on the number of layers, the thickness of the other layers, the porosity of the layers, and other considerations addressed herein.

Each active composite unit 16 also comprises a second layer 24 of catalyst formed on the first layer 20 and comprised of a high energy density material 26. The high energy density material 26 can be a silicon material or a tin material, for example. The silicon material can be silicon, a silicon alloy, a silicon/germanium composite, silicon oxide and combinations thereof. The tin material can be tin, tin oxide, a tin alloy and combinations thereof. Other high energy density materials known to those skilled in the art are also contemplated. The second layer 24 can also include a carbon material, which can include one or more of graphene, graphite, surface modified graphite, carbon nanotubes, carbon black, hard carbon, soft carbon and any other carbon materials known to those skilled in the art having the requisite electrochemical activity. The carbon material in the second layer can be the same as the carbon material 22 in the first layer 20 or can be a different carbon material. The carbon material can be selected for its porosity. For example, the porosity of the second layer 24 can be selected to be less than the porosity of the first layer 20 to achieve an even porosity across all layers after lithiation and cycling has occurred. The second layer 24 can also include a binder.

Figure 3:
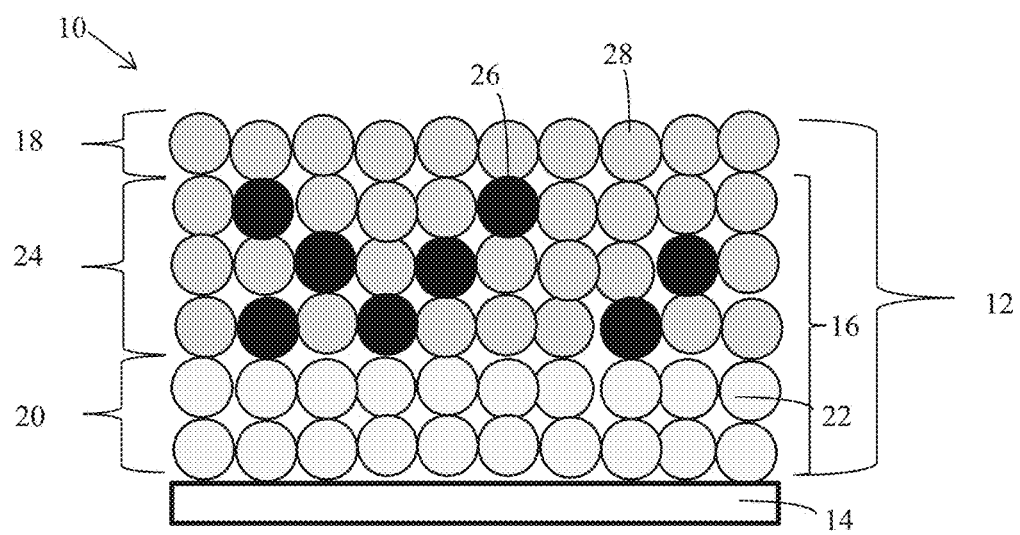
FIG. 3 is a schematic drawing of an aspect of the embodiment of the electrode in FIG. 2.

The second layer 24 can range in thickness from about 2 μm to about 20 μm. The thickness will be selected depending on the number of layers, the thickness of the other layers, the porosity of the layers, and other considerations addressed herein. For example, in FIG. 2 the first layer 20 has a first thickness and a first porosity and the second layer 24 has a second thickness and a second porosity. In FIG. 3, the second layer 24 has a greater thickness than the second layer 24 of FIG. 2. To accommodate this, the first layer 20 of FIG. 3 has a greater porosity than the first layer 20 of FIG. 2, as illustrated with the lighter shade. This increase in porosity will act as a sponge to better accommodate the expansion of the thicker second layer 24 of FIG. 3. The porosity will be achieved by selection of one or more carbon materials. The porosity of each layer can range between about 20 percent and 40 percent.

The top layer 18 is formed on the second layer 24 of the active composite unit 16. If there are more than one active composite unit 16, the top layer 18 will be formed on the outermost second layer 24. The top layer 18 consists essentially of a second carbon material 28 having electrochemical activity and a binder. The carbon material 28 can include one or more of graphene, graphite, surface modified graphite, carbon nanotubes, carbon black, hard carbon, soft carbon and any other carbon materials known to those skilled in the art having the requisite electrochemical activity. The carbon material 28 in the top layer 18 can be the same as the carbon material 22 in the first layer 20 or can be a different carbon material. The carbon material 28 in the top layer 18 can be selected for its porosity. For example, the porosity of the carbon material 28 in the top layer 18 can be selected to be less than the porosity of the carbon material 22 in the first layer 20 to achieve an even porosity across all layers after lithiation and cycling has occurred. The top layer 18 can range in thickness from about 2 μm to about 20 μm. The thickness will be selected depending on the number of layers, the thickness of the other layers, and other considerations addressed herein. The top layer 18 will typically have a smaller thickness than the other layers in the electrode 10.

FIG. 4 illustrates an embodiment of an electrode 100 having two active composite units 16, 16'. The number of active composite units can vary from one to about five as required by those skilled in the art. Each active composite unit 16, 16' has a first layer 20, 20' and a second layer 24, 24'. The first layer 20 of the first active composite unit 16 is formed on the current collector 14. The second layer 24 of the first active composite unit 16 is then formed on the first layer 20. The first layer 20' of the second active composite unit 16' is formed on the second layer 24 of the first active composite unit 16, and the second layer 24' is then formed on the first layer 20'. The top layer 18 is then formed on the outermost layer, which is the second layer 24' of the second active composite unit 16' in this embodiment.

The material of each layer can be selected to obtain a desired or required porosity to obtain even current distribution and porosity across the multi-layer active catalyst 12. As illustrated in FIG. 4, the first layer 20 consists essentially of a carbon material 22 having a first porosity. The second layer 24 and each layer of the second active composite unit 16' are composed of a carbon material having a second porosity. The top layer 18 consists essentially of a carbon material with a third porosity. The first porosity is greater than the second porosity, which is greater than the third porosity. It is also contemplated that the second layer 24 and each layer of the second active composite unit 16' having varying porosities, decreasing as the layers move away from the current collector 14. Although the thickness of each layer in the electrode 100 of FIG. 4 is illustrated as being equal, this is only an example and is not meant to be limiting. The thickness of each layer can vary across the electrode 100 as desired or required by one skilled in the art.

Each electrode 10, 100 having a multi-layer active catalyst 12 will have a concentration of the high energy density particles 26, with the concentration of the high energy density particles 26 in each second layer 24 of an active composite unit 16 varying depending on the number of active composite units 16. For example, a multi-layer active catalyst 12 can have a concentration of silicon of about six percent to eight percent by weight. If the multi-layer active catalyst 12 only has one second layer 24, as illustrated in FIG. 2, the concentration of silicon in the second layer 24 will be substantially higher than six to eight percent, as it is the only layer to contain silicon. With two second layers 24, 24' as illustrated in FIG. 4, the concentration of silicon in each of the second layers 24, 24' will be greater than six to eight percent, but less than the concentration would be with only one second layer.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrode comprising:
   a current collector; and
   a multi-layer active material formed on the current collector comprising:
   at least one active composite unit comprising:
      a first layer formed on the current collector of catalyst consisting essentially of a first carbon material having electrochemical activity and a binder, the first layer having a first porosity between 20% and 40%, inclusive, and a first thickness between 2 μm to about 20 μm, inclusive;
      a second layer of catalyst formed on the first layer comprising a high energy density material and having a second porosity between 20% and 40%, inclusive, and a second thickness between 2 μm to about 20 μm, inclusive; and
   a top layer formed on the at least one active catalyst composite consisting essentially of a second carbon material having electrochemical activity and a binder, the top layer having a third porosity between 20% and 40%, inclusive, and a third thickness between 2 μm to about 20μm, inclusive, wherein the first porosity is greater than the second porosity, which is greater than the third porosity, and wherein the third thickness is less than each of the first thickness and the second thickness, and wherein the larger the second thickness, the greater the first porosity.

2. The electrode of claim 1, wherein the first carbon material and the second carbon material are one or more of graphite, a surface modified graphite, hard carbon, soft carbon, graphene, carbon black, carbon nanotubes and combinations thereof.

3. The electrode of claim 1, wherein the first carbon material and the second carbon material are the same.

4. The electrode of claim 1, wherein the first carbon material and the second carbon material are different.

5. The electrode of claim 1, wherein the high energy density material of the second layer is one or more of a silicon material and a tin material.

6. The electrode of claim 5, wherein the silicon material is one or more of silicon, a silicon alloy, a silicon/germanium composite, silicon oxide and the tin material is one or more of tin, tin oxide, and a tin alloy.

7. The electrode of claim 5, wherein the high energy density material is the silicon material, and the at least one multi-layer active material has a silicon concentration of between six percent and eight percent by weight.

8. The electrode of claim 1, wherein the at least one active composite unit is two or more active composite units layered between the current collector and the top layer.

9. An electrode comprising:
   a current collector;
   a first layer formed on the current collector consisting essentially of a first carbon material having electrochemical activity and a binder, the first layer having a first porosity between 20% and 40%, inclusive, and a first thickness between 2 μm to about 20 μm, inclusive;
   a second layer formed on the first layer comprising one or both of a silicon material and a tin material, the second layer having a second porosity between 20% and 40%, inclusive, and a second thickness between 2 μm to about 20 μm, inclusive; and
   a top layer consisting essentially of a second carbon material having electrochemical activity and a binder, the top layer having a third thickness between 2 μm to about 20 μm, inclusive, wherein the third thickness is smaller than both the first thickness and the second thickness, and wherein the greater the second thickness of the second layer, the greater the first porosity of the first layer; and
   a fourth layer formed on the top layer comprising the one of the silicon material and the tin material, wherein the first porosity of the first layer is greater than a porosity of the top layer and the porosity of the top layer is greater than a porosity of the fourth layer, wherein the porosity of each of the top layer and the fourth layer is between 20 percent and 40 percent.

10. The electrode of claim 9, wherein the first carbon material and the second carbon material are the same.

11. The electrode of claim 9, wherein the first carbon material and the second carbon material are different.

12. The electrode of claim 9, wherein the silicon material is one or more of silicon, a silicon alloy, a silicon/germanium composite, silicon oxide and the tin material is one or more of tin, tin oxide, and a tin alloy.

13. The electrode of claim 9, wherein the second layer and the fourth layer comprise the silicon material, and a concentration of silicon in the electrode is between six percent and eight percent by weight.

* * * * *